United States Patent [19]
Lozier et al.

[11] Patent Number: 5,537,786
[45] Date of Patent: Jul. 23, 1996

[54] HURRICANE-RESISTING BUILDING ROOF STRUCTURE TIE-DOWN

[75] Inventors: James P. Lozier, Tolland; Gerard A. Lalancette, Manchester; Joseph F. Luzzi, Avon, all of Conn.

[73] Assignee: Orage Corporation, Pinellas Park, Fla.

[21] Appl. No.: 103,372

[22] Filed: Aug. 6, 1993

[51] Int. Cl.⁶ ............................................................. F04B 7/00
[52] U.S. Cl. ........................................ 12/23; 52/698; 52/12
[58] Field of Search ........................... 52/23, 24, 25, 52/12, 13, 83, 156, 143, 698, DIG. 11, 149

[56] References Cited

U.S. PATENT DOCUMENTS

| | | | |
|---|---|---|---|
| 269,018 | 12/1882 | Crowell et al. | 52/23 |
| 354,342 | 12/1886 | Pratt | 52/23 |
| 777,441 | 12/1904 | Small | 52/23 |
| 844,861 | 2/1907 | Gill | 52/23 X |
| 1,192,027 | 7/1916 | Acheson | 52/23 |
| 1,864,403 | 6/1932 | Bradley | 52/23 |
| 2,306,537 | 12/1942 | Hamm | 52/23 X |
| 2,573,987 | 11/1951 | Sage | 72/1 |
| 3,449,874 | 6/1969 | Beaupré | 52/149 |
| 3,757,475 | 9/1973 | Hackworth | 52/23 |
| 3,776,054 | 4/1973 | Anderson et al. | 52/DIG. 11 |
| 3,881,694 | 5/1975 | Gardner | 52/DIG. 11 |
| 3,894,365 | 7/1975 | Abbott | 52/23 |
| 3,939,729 | 2/1976 | Brockelsby | 74/575 |
| 4,079,556 | 3/1978 | Luck et al. | 52/698 |
| 4,253,281 | 3/1981 | Ruttenberg | 52/12 |
| 4,401,880 | 8/1983 | Eisenhoefer | 52/11 |
| 4,473,984 | 10/1984 | Lopez | 52/698 |
| 4,852,308 | 8/1989 | Papenbrock et al. | 52/12 |
| 5,319,896 | 6/1994 | Winger | 52/23 |

*Primary Examiner*—Carl D. Friedman
*Assistant Examiner*—Winnie Yip
*Attorney, Agent, or Firm*—M. P. Williams

[57] ABSTRACT

In preparation of a building to have its roof structure secured to its vertical wall structure by tie-down straps, a plurality of anchors are secured to the foundation in pairs, on opposite sides of the building, and a tie-down strap guide is secured over the ridge of the building between the related anchors. The tie-down straps are connected to anchors by tensioning devices which include a ratchet and may include a connector to permit the ratchet to be disposed at a distance from the anchor. Ridge guides retain the straps above the rafters and/or gable ends. The anchors comprise eye bolts with reinforcing webs thereon. Blocks located at the eaves prevent the tie-downs from crushing the drip edge of the roof; pass-through holes in gutters permit the tie-down straps to pass through the gutters without crushing them; the pass-through holes in the gutters may have vertically extending wells associated therewith to prevent rainwater from flowing through the pass-through holes. The straps are pre-stretched before being stored for future use.

33 Claims, 3 Drawing Sheets

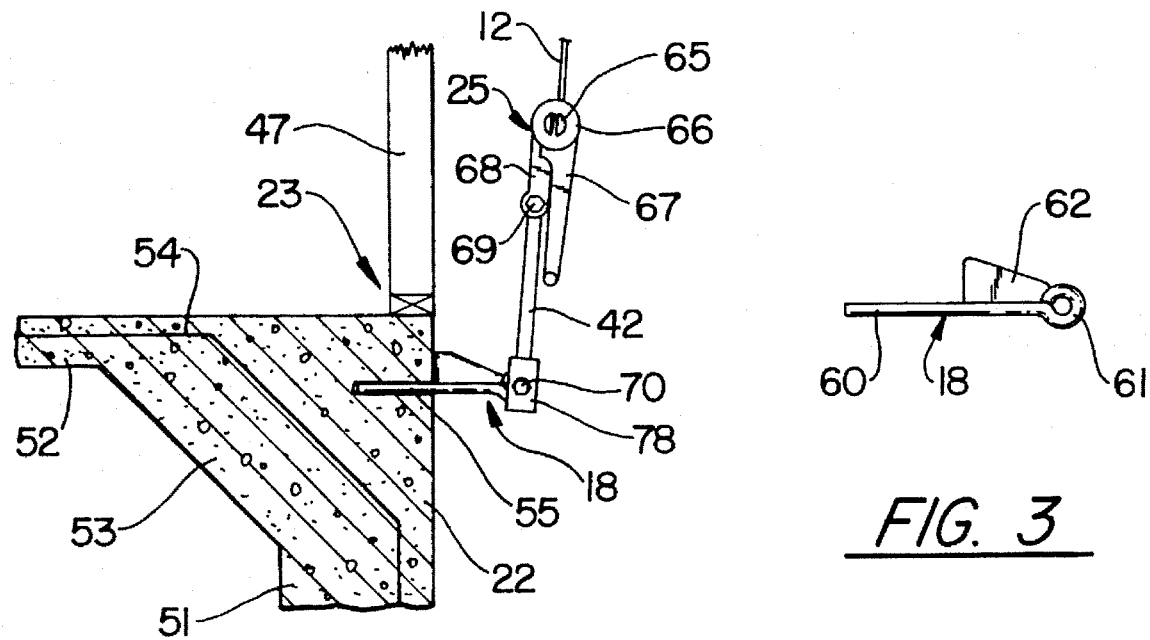
FIG. 2
FIG. 3
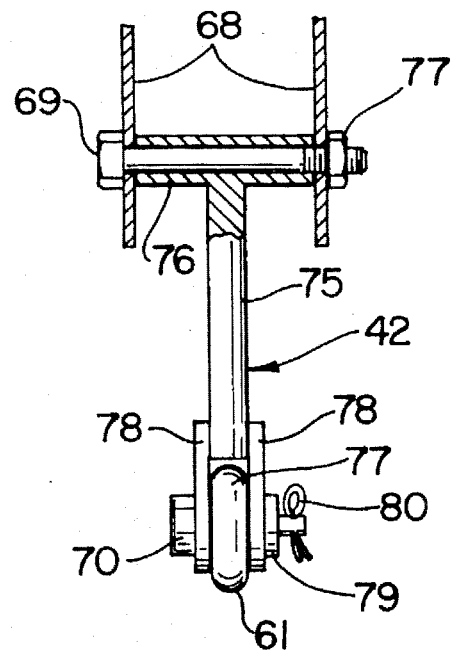
FIG. 4
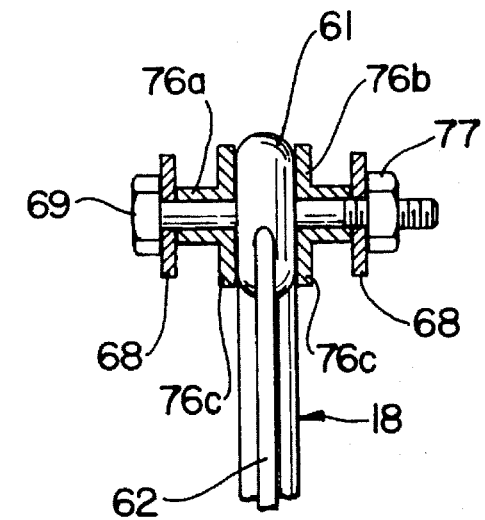
FIG. 5

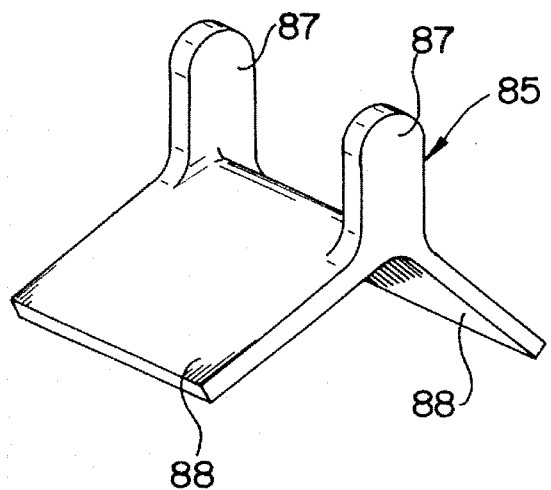
FIG. 6
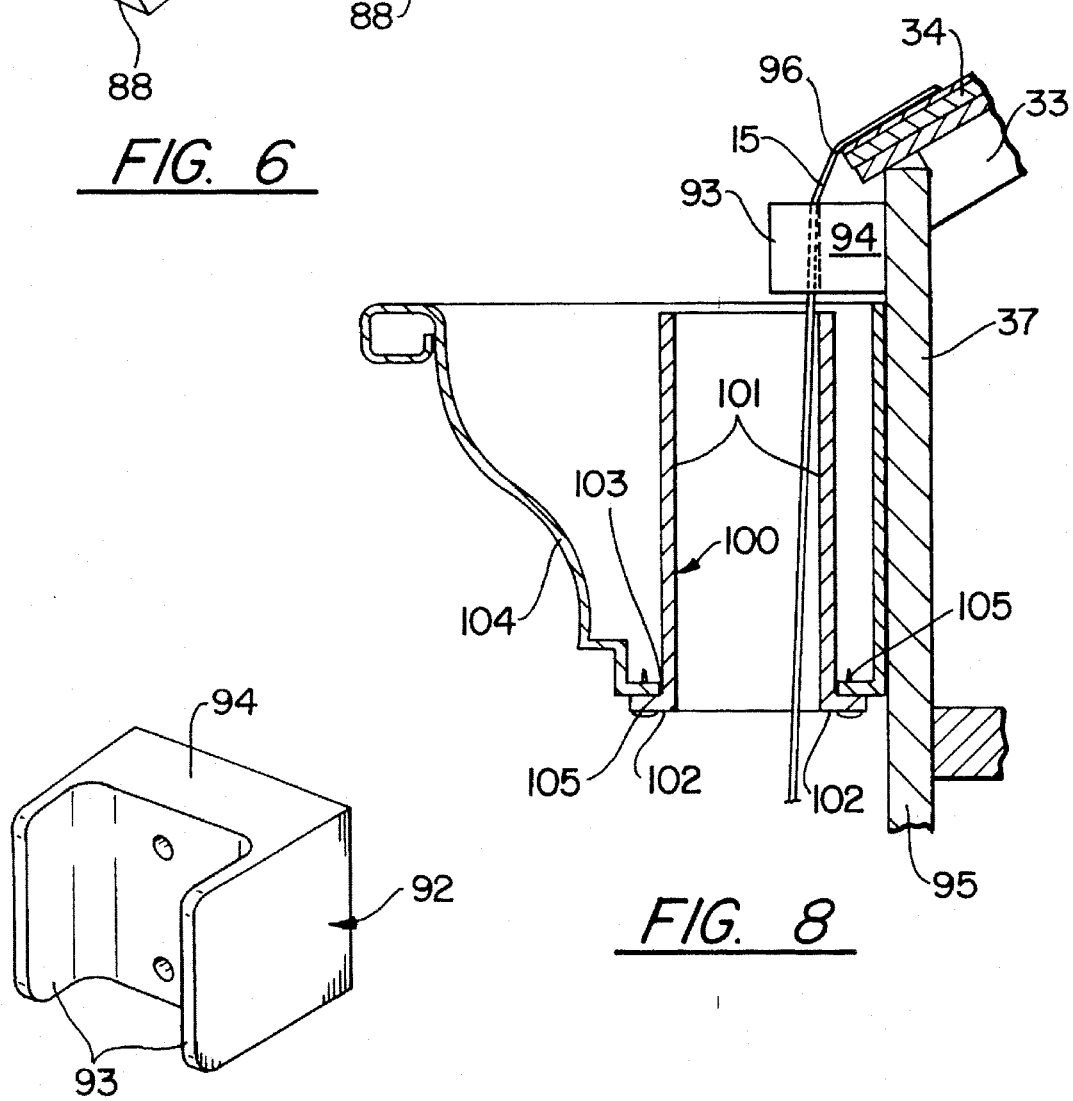
FIG. 8
FIG. 7

HURRICANE-RESISTING BUILDING ROOF STRUCTURE TIE-DOWN

TECHNICAL FIELD

This invention relates to tying down the roof structure of a house so as to reduce the likelihood the roof structure separating from the vertical framing of the house or other building during high winds, such as a hurricane.

BACKGROUND ART

In areas which are subject to extremely high winds, such as coastal areas in the southern portions of the northern hemisphere, one particular type of damages which result to structures, particularly dwelling structures, is the separation of the entire roof structure from the remainder of the building. It has been found that the bulk of instances where a home is totally demolished result from the roof structure parting from the remainder of the house, basically as a unit. This is in contrast to the various pieces of the roof structure (e.g., the shingles, the sheathing, etc.) being ripped off a piece at a time. It has also been noted that modern trailers which are provided with a reinforced encircling rib structure which is attached to a concrete pad upon which the trailer sits, are less likely to be totally demolished than are trailers which are not reinforced and tied down. From this, many governmental units in the affected areas have provided building codes which require that the roof rafters, typically part of a truss structure, be secured to the top plates of the vertical framing by more than the usual nail-down. This may include steel braces at the joint of the rafters with the top plate or at the joint of a ceiling joist portion of a truss with the top plate. This may also include tying the top plate to the studs, the studs to the bottom plate, and the bottom plate to the foundation. It is believed to be true that the effectiveness of such code provisions has been well borne out by the successful reduction of total-demolition damage to homes which have had the additional tie-downs provided in accordance with such codes. However, the codes are applied prospectively, and are not useful in protecting homes or other buildings constructed before the provisions of the code were in effect. Retrofitting older buildings with brackets, braces and plates to secure the roof structure to the vertical framing and/or foundation is extremely difficult, and in most cases not practical.

DISCLOSURE OF INVENTION

Objects of the invention include: tying a roof structure of a building to the vertical framing thereof; providing a roof structure tie-down system which, after pre-installation by professionals, is easily put into place for use on an emergency basis by non-professionals; provision of tie-downs for roof structures which are effective, low in cost, and do not detract from the appearance or otherwise diminish the value of the building where used.

This invention is predicated on the belief that the bulk of unrepairable damage to buildings such as homes from high winds is caused by separation between the roof structure as a whole and the vertical framing of the building, and in part on the belief that the separation of a roof structure from the vertical framing of a building most likely occurs from pressure differentials (lift) created by airfoil effects (vacuum) as a consequence of the high velocity of the wind over the surface of the roof, rather than by simply toppling the building by horizontal wind forces.

According to the present invention, anchors are secured to the foundation, below the eaves, on opposite sides of a building and tie-down straps are tensioned between related anchors disposed on opposite sides of the building. According further to the invention, guides may be provided on the building in alignment with the anchors so as to cause the tie-down straps to remain in a proper position even under very severe wind conditions. According still further to the invention, the anchors are placed periodically along the building so as to align the tie-down straps with gable ends and/or rafters within the roof structure. In accordance with the invention further, blocks may be provided to keep the tie-down straps from collapsing drip edges, ridge vents, and the like, and water-containing pass-throughs may be provided in rain gutters to permit tie-downs to pass therethrough thereby to avoid collapsing them. According to the invention further, the tie-down straps are pre-stretched to several hundred pounds before being stored for future use in real, high-wind situations.

The invention provides a low-cost capability for tying the roof structure of a building to the vertical framing thereof so as to resist separation therebetween during high winds.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2 is a broken away, partially sectioned side elevation view of a tie-down strap anchored to a foundation through a ratchet and a connector in accordance with the present invention.

FIG. 3 is a side elevation view of the anchor of FIG. 2.

FIG. 4 is a partial, broken away, partially sectioned front elevation view of the anchor, tie-down ratchet and connector of FIG. 2.

FIG. 5 is a partial, broken away, partially sectioned top plan view of an alternative to the embodiment of FIG. 4.

FIG. 6 is a perspective view of a tie-down strap ridge guide.

FIG. 7 is a perspective view of a tie-down strap drip edge block and guide.

FIG. 8 is a partial, broken away, partially sectioned side elevation view of a rain gutter, modified in accordance with the present invention, in conjunction with the block and guide of FIG. 7.

BEST MODE FOR CARRYING OUT THE INVENTION

Figure 1:
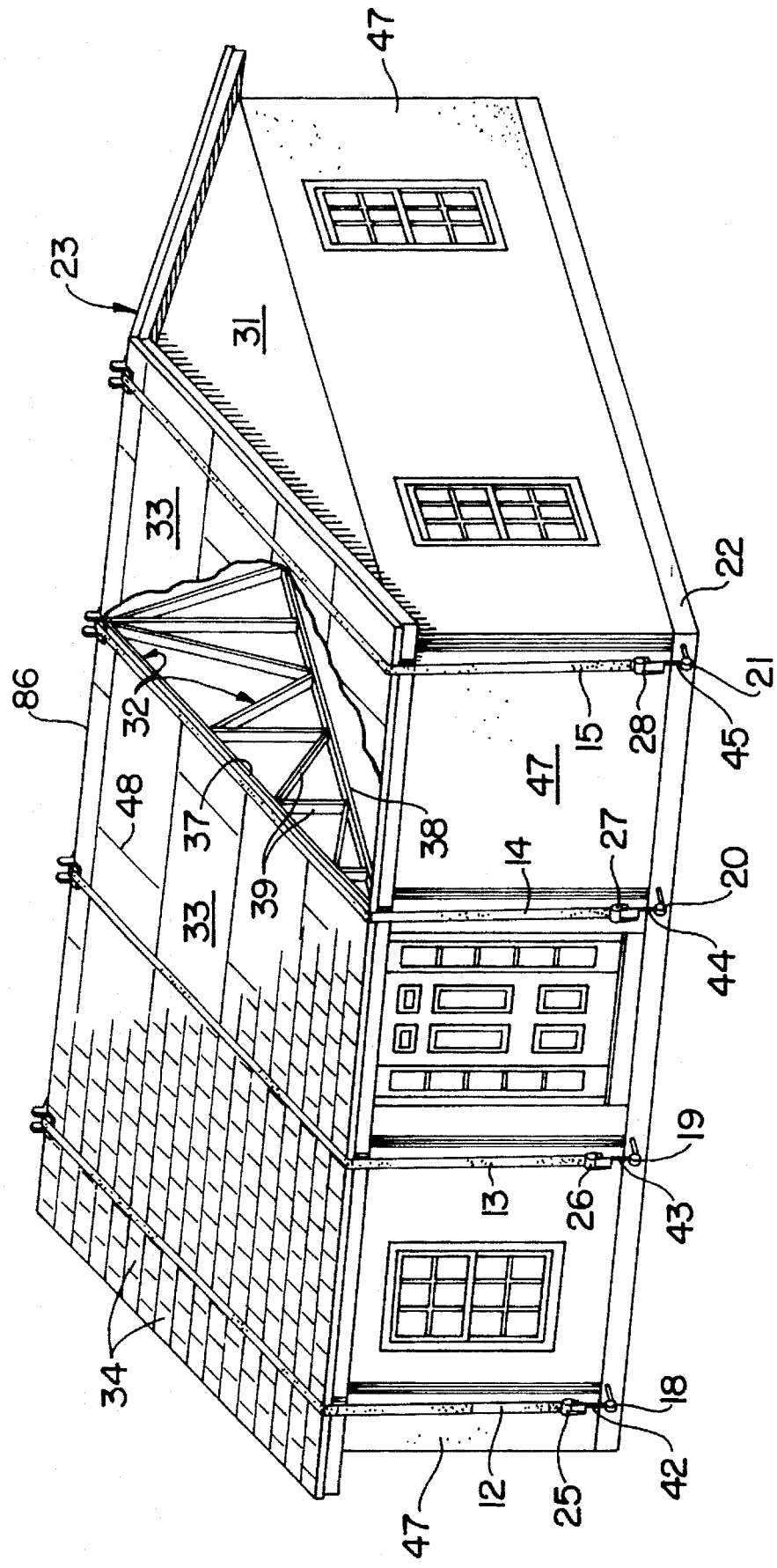
FIG. 1 is a perspective view, partially broken away, of a dwelling with the roof structure tied down to the vertical framing of the building in accordance with the present invention.

Referring now to FIG. 1, a plurality of tie-down straps 12–15 are tensioned between a corresponding plurality of anchors 18–21, secured in the foundation 22 of a building such as a dwelling 23, and corresponding anchors (not shown) on the opposite side of the building 23, by means of ratchet winches 25–28 (and similar ratchet winches, not shown, on the opposite side of the building, referred to sometimes hereinafter simply as ratchets). The roof structure of the dwelling 23 comprises gable ends 31, a plurality of trusses 32, a plurality of sheets of sheathing 33, and shingles 34. The trusses 32 consist of rafters 37, ceiling joists 38 and braces 39. Instead of trusses, the roof structure could be comprise of rafters 37 and ceiling joists 38, with or without additional bracing structure, depending upon the support provided thereto by the underlying vertical wall structures, all as is known in the art. The gable ends 31 typically include rafters 37; as used herein, the term "rafters" includes rafters in trusses or not, and gable ends. In FIG. 1, the ratchets 25–28 are connected to the anchors 18–21 by connectors 42–45. The tie-down strap 14 is shown positioned immediately above the rafter 37 of the truss 32. The tie-down strap 15 is shown positioned immediately above the gable end 31. This is the preferred way of practicing the present invention. However, the tie-down strap 12 is shown positioned inwardly of the corresponding gable end, over a truss 32 or other rafter 37. In the usual case, and in order to reduce the amount of torque which could result from lifting of an end of the roof structure (as at the gable end 31), it is preferred that the gable end 31 (and the corresponding other gable end) be tied down to the vertical framing structure of the dwelling 23. FIG. 1 also illustrates that the straps should be not more than eight feet apart so as to ensure tying down, at least at one point, each of the sheets 33 of roof sheathing. The straps may be closer together, if desired, and may fall on the inter-sheet joints, such as the joint 48 if necessary in order to provide reasonable spacing of a reasonable number of straps, with each of the straps over a rafter 37. However, it should be borne in mind that history indicates that the danger of total destruction of a dwelling is a consequence of the roof pulling apart piece by piece is far less than the danger of it occurring as a result of the roof structure 31–39 parting from the vertical wall structure 47 of the dwelling 23.

In FIG. 2, the foundation 22 consists of the footing portion 51 and a floor portion 52. At the joint 53 between these two portions, reinforcing bar 54 may be used (or not). The anchor 18 is secured in a hole 55 within the foundation 22. As examples, the anchor 18 may comprise a ¾ inch eye-bolt (FIG. 3) having a shaft 60, an eye 61 and a reinforcing web 62. The reinforcing web 62 reduces the tendency of the anchor 18 to bend upwardly in response to tension in the tie-down straps 12–15. The web 62 may be welded to or forged with the shaft and the eye, and may provide a closure for the eye 61 if desired, as shown in FIG. 3. On the other hand, the eye may be positioned the other side up and welded shut separately from mounting of the reinforcing web 62. The anchor 18 may be secured in a hole 55 which is of a diameter to barely provide clearance for the shaft 60, in which case the shaft 60 could be anchored to the foundation 22 with a suitable, high strength epoxy resin or other bonding agent. Alternatively, the hole 55 may be provided with clearance with respect to the shaft 60 and the shaft 60 may be secured to the foundation 22 by means of hydro-cement, or other high strength concrete-like agent. Thus, if a ¾ inch anchor 18 is utilized, the hole 55 may be ¾ inch or may be ⅞ inch. Preferably, the anchor should extend at least four inches into the foundation 22 and the hole 55 should be at least four or five inches from any edge of the foundation 22. In FIGS. 2 and 3, the eye-bolt shaft 60 is not threaded; as used herein, the term "eye-bolt" means a shaft 60 with an eye 61, whether or not the shaft is threaded.

In FIG. 2, the ratchet 25 includes a split axle 65 through which the tie-down strap 12 can be inserted for engagement, to be wound around the axle 65. The axle 65 is connected through a ratcheting mechanism 66 to a handle 67 which is moved relative to frame members 68 so as to roll the tie-down strap 12 onto the axle 65 and provide tension to the strap 12. The frame members 68 are connected by a bolt 69 to one end of the connector 42, the other end of which is connected to the anchor 18 by means of a bolt 70. As seen in FIG. 4, the connector 42 has a shank 75 welded at one end to a hollow tube 76 (which is shown as a cylinder, but need not be), the length of the tube 76 is equal to the spacing between the frame members 68 of the ratchet 25, which receives the bolt 69 and allows tightening the assembly together by means of a nut 77. The other end of the connector 42 has a clevis 77 formed therein by a pair of plates 78 which are welded to the shank 75 and drilled out so as to receive the bolt 70. The size of the shank 75 may be selected to be the same as the diameter of the anchor 18 so as to facilitate forming a clevis of the correct size by simply welding the plates 78 thereon. The bolt 70 may be secured with a washer 79 and a cotter pin 80 or other quick release pin. This allows fastening the strap, ratchet and connector assembly to the anchor quickly in the case of a hurricane warning.

In FIG. 5, an alternative embodiment of the invention does not utilize a connector 42 between the anchor 18 and the ratchet 25. Instead, a pair of spacer cylinders 76a, 76b are disposed over the bolt 69 to space the anchor 18 between the frame members 68 of the ratchet 25. The spacers 76a, 76b have flanges 76c thereon to prevent the bolt 69 from wobbling within the eye; this helps prevent whipping of the strap and banging the building with the ratchet. As seen in FIG. 5, the web 62 may have a thickness which is some fraction, such as ⅓, of the diameter of the eye bolt 18. For instance, a ¼ inch web 62 would be suitable on a ¾ inch anchor 18. In cases where the anchors are well above ground level, the tensioning means may include the ratchets 25 connected directly to the anchors 18 as illustrated in FIG. 5. In other cases, the tensioning means may include ratchets 25 and the connectors 42 of suitable length.

Referring now to FIG. 6, a guide 85 for the tie-down straps 12–15, to keep them properly positioned above the rafters 37 at the ridge 86 (FIG. 1) of the building 23 may comprise a pair of ears 87 extending upwardly from the juncture of a pair of flaps 88 that may be used to nail or otherwise secure the guide 85 to the ridge 86 at the appropriate points. In the case where the ridge 86 contains a honeycomb, or other integrated vent, the thickness of the flaps 88 may be made sufficient so as to replace a portion of such a ridge vent, a section of which may be cut out and discarded and the guide 85 fastened in place thereof. In cases where there is no ridge vent, the guide 85 may simply be fashioned over the cap; but if the cap is thick, then a portion of the cap should be cut away so that the tie-down straps 12–15 lie essentially along the shingles 34 in a uniform fashion, all the way from the eaves to the ridge, thereby to assist in resisting upward pressure as a result of high wind forces. Alternative ridge guides may comprise a pair of pins, such as lag bolts threaded through a ridge pole, or a pair of spikes, positioned where the ears 87 would be. FIG. 7 illustrates a combined guide and block which includes a pair of ears 93 extending from a block portion 94, the guide and block 92 may be nailed, screwed or otherwise fastened to a fascia 95 as shown in FIG. 8, which in turn is fastened to the tail of a rafter 37. The block portion 94 (FIG. 8) of the guide and block 92 causes the tie-down straps 12–15 to stand off from the fascia 95 sufficiently so as not to break-over the drip edge 96 of the roof, whether it be a piece of drip edge trim, or simply the edge of the shingles 34 as shown in FIG. 8. The ears 93 keep the tie-down straps 12–15 aligned along the building 23 at the desired position (that is, covering each of the gable ends 31 or rafters 37 with which the anchors 18–21 are also aligned).

In FIG. 8 there is also shown a gutter well 100 which generally is the same shape as a down spout cuff which normally connects a gutter to a down spout. The well 100 is simply an elongated closed vertical wall 101 having a flange 102 formed at the bottom thereof. The well 100 is passed through a hole 103 made in the bottom surface of the gutter 104 and attached thereto in any suitable way so as to not leak, such as by rivets 105. The well 100 allows the tie-down strap 15 to pass through the gutter 104 without collapsing it. If desired, when the system is not in use, the well 100 may be provided with a simple rubber or plastic cap to keep roof water from dripping excessively therethrough. However, these should be easily removed from the ground in the event of the need to use the system.

Use of the invention is contemplated as employing an initial, pre-use installation, which includes locating the positions of the rafters 37, from that determining the number and location of anchors 18–21 to be utilized on each side of the building 23, securing the anchors, and securing any blocks and/or guides 85, 92 at appropriate positions along the eaves and at the ridge of the building 23. On a simple building, as in FIG. 1, the anchors for a given tie-down strap will be secured to the foundation in the same transverse plane as one pair of rafters or a gable end; a related ridge guide will also be fastened to the building in the same transverse plane. At this point in time, the tie-down straps 12–15, with the ratchets 25–28 and connectors 42–45 (if connectors are used), together with corresponding ratchets and connectors for the other side of the building 23, are not installed on the building 23, but are stored in a suitable place. The second phase of use occurs when a hurricane or other storm with excessive wind appears to be imminent. Then, it is necessary to position the tie-down straps 12–15 over the building 23. It is presently contemplated that the best way to do this is to send a feeder line over the building 23; this may consist of a light wire or rope with a weight on one end which can be launched over the house, either by throwing it, or by means of a spring gun or a bow. The line is attached to one or more of the straps 12–15 and is then pulled over the house; in fact, all of the straps can be pulled over at the same time, manually or mechanically, in the usual case of a simple building as shown in FIG. 1. Then the straps are snapped around until each is lying flat and properly positioned within the guides 85, 92 to ensure that they are positioned above the rafters 37. Or if appropriate, a person can mount the roof to place the straps appropriately within the guides. The end of the strap which is drawn over the roof is not connected to the ratchet until after it is positioned on the roof.

Thereafter, each of the connectors 42–45 is pinned to the corresponding anchor 18–21 (and similarly on the other side of the house). The handles 67 of each of the ratchets can then be operated until proper tension is applied to the straps 12–15. Although it depends in part upon the particular strap used, there may be a stretching phenomenon which has to be accommodated by retightening of the straps, such as after one-half hour, to ensure that they are sufficiently tight to hold the roof structure to the vertical wall structure 47. Various methods can be utilized to assure proper tightness. For instance, purely empirical judgment may be used. Or, in a three inch polypropylene strap which extends for about 7 or 8 feet between the anchor and the eaves, a lateral displacement upon the order of 3 inches which is moderately easy for a rugged male or merely achievable for a frail male or female indicates a tension on the order of about two hundred pounds, and should be adequate. Excessive tension can result in unnecessary damage to the structure. The tension required to hold the roof structure to the vertical wall structure 47 will be, simply, whatever it takes. It isn't necessary to have the straps 12–15 under excessive tension prior to buffeting by excessive winds. What is necessary is that the straps will resist sufficient upward lift pressure on the roof, without stretching. By applying on the order of two hundred pounds tension to each strap for about a half-hour or more at the initial installation, the straps will pre-stretch, thus having a minimal tendency to stretch when in ultimate, future use. A tensiometer may be utilized, which can either be inline or lateral. An inline tensiometer simply measures through spring extension the amount of force applied between one of the straps and its anchor. Or a lateral tensiometer may be used on each of the straps, which simply measures the pressure required for a given lateral displacement of the type described hereinbefore. Measuring one and then achieving a similar feel of the other ratchets would assure that the other straps were suitably set. After the straps are all pre-stretched, the straps and tensioning devices are removed from the building and stored for future use; the anchors, guides and blocks remain in position, ready for use.

It is presently contemplated that woven polypropylene tie-down straps of approximately 1/16 inch thickness and 3 inches in width, such as Absorb Edge®, manufactured by Elizabeth Webbing, Pawtucket, R.I., are best suited for the invention. Smaller straps might not distribute the forces sufficiently to assure proper operation; straps which are wider might capture too much wind and provide undesired whipping in the straps. For a 3 inch polypropylene strap, the ratchet 25 may comprise a Kinedyne p/n 806, or an equivalent Anchora ratchet.

In the event that the roof of the building 23 has excessive irregularities, such as clay tile roofing or architectural outcroppings of any sort, a sled or other device may be used to assist the tie-down straps 25–28 in clearing such obstacles. For example, a 2 liter plastic soft drink bottle, with its bottom removed, can be used as a fairweather so that the strap will not get caught on any abutments as it is being drawn over the roof.

In FIG. 1, it appears as though all of the anchors 18–21 are above grade level. However, in some instances, it may be necessary to go below grade level to find a suitable point for attaching the anchors to the foundation. In such a case, the anchors may be placed within a small well, which can simply consist of a plastic tube of a suitable diameter with an easily removable cap thereon, or another readily available structure, such as a five gallon joint compound bucket with its cap thereon. It is important to provide suitable clearance for operating the ratchets on both sides of the house so that one does not apply excessive tension on one side of the structure and have insufficient tension to hold the roof structure to the vertical sidewall structure 47 on the other side of the building.

The tie-down straps could be webbing of other materials, such as steel, or could be formed with cables and load-spreading surfaces, such as plates. But woven plastic webbing, as described, is preferred.

The tensioning means need not include ratchets; instead, the tensioning means may include turnbuckles, jack screws or other threaded devices, worm gears, hydraulic or pneumatic devices, or other types of winches, or otherwise.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A building system, comprising:

a building having a foundation including a pair of holes on opposite side of the building, said building having a roof structure and a vertical wall structure supporting said roof structure on said foundation;

a flexible tie-down strap extending over a transverse plane of said roof structure in the vicinity of said holes;

a pair of anchors having first and second ends, each of said anchors affixed at said first end within one of said holes, each of said anchors having a hole in said second end;

a pin for each of said anchors, each said pin having a clearance fit within the hole of the corresponding anchor; and a pair of tensioning devices, one for each end of said tie-down strap, each connected to the corresponding anchor by means of said pins, each said tensioning device engaging one end of said tie-down strap and operable to draw said strap toward said tensioning device, to thereby firmly tie said roof structure to said wall structure.

2. A system according to claim 1 wherein each of said anchors is an eye bolt having a reinforcing web secured thereon perpendicular to the axis of the eye thereof to resist bending.

3. A system according to claim 1 wherein said tensioning device includes a connector connected to said anchor by means of said pin, and a ratchet winch connected thereto, said ratchet winch operable to draw said strap toward said tensioning device, said connector allowing said ratchet winch to be disposed at a distance from said anchor.

4. A system according to claim 3 wherein said connector has, at a first end thereof, a clevis engaging said anchor by means of said pin, and is secured to said ratchet at a second end thereof.

5. A system according to claim 1 wherein said roof structure includes rafters; and further comprising:

a guide mounted to the building at a point aligned with one of said rafters to retain said tie-down strap in alignment with and above said rafter.

6. A system according to claim 5 wherein:

said roof structure includes a ridge; and said guide is mounted on the ridge of the building.

7. A system according to claim 1 wherein:

said roof structure includes a drip edge; and further comprising:

a block mounted to the building below said drip edge to prevent said tie-down strap from crushing said drip edge when said tie-down strap is tensioned over said roof structure between said anchors.

8. A system according to claim 7 wherein said block includes ears to retain said tie-down strap over said block.

9. A system according to claim 1 wherein said tensioning device includes a ratchet winch connected to said anchor by means of said pin and operable to draw said tie-down strap toward said ratchet winch.

10. A building system, comprising:

a building having a foundation, a roof structure and a vertical wall structure supporting said roof structure on said foundation;

a plurality of tie-down straps extending over said roof structure;

a plurality of anchors secured to said foundation, including one anchor for each end of each of said tie-down straps, each anchor secured to said foundation at a point selected to cause the related tie-down strap to assume a predetermined position on said roof structure; and a plurality of tensioning devices, each of said tensioning devices engaging a corresponding end of one of said tie-down straps and being connected to one of said anchors, said tensioning devices providing tension to said tie-down straps.

11. A system according to claim 10 wherein said foundation has holes therein; and each of said anchors is bonded within one of said holes.

12. A system according to claim 10 wherein said roof structure includes pairs of rafters disposed in corresponding transverse planes of said building; and each pair of anchors related to one of said tie-down straps is secured to said foundation in the same transverse plane of said building as one of said pairs of rafters.

13. A system according to claim 12 wherein said roof structure includes a ridge; and further comprising:

a plurality of ridge guides secured to said ridge, each secured in the same transverse plane as a pair of said anchors, to retain the related one of said tie-down straps above a corresponding pair of said rafters.

14. A system according to claim 10 wherein said roof structure includes a gable end; and further comprising:

one pair of anchors related to one of said tie-down straps secured to said foundation in the same transverse plane of said building as said gable end.

15. A system according to claim 14 wherein said roof structure includes a ridge; and further comprising:

a ridge guide secured to said ridge in the same transverse plane as said one pair of anchors, to retain the related one of said tie-down straps above said gable end.

16. A system according to claim 10 wherein each of said anchors is an eye bolt having a reinforcing web secured thereon perpendicular to the axis of the eye thereof to resist bending, and each eye bolt is connected to one of said tensioning devices by a pin.

17. A system according to claim 16 wherein said tensioning devices each include a connector and a ratchet winch connected thereto, said ratchet winch operable to draw said tie-down strap toward said ratchet winch, said connector being connected to said anchor by means of said pin, said connector allowing said ratchet winch to be disposed at a distance from said anchor.

18. A system according to claim 17 wherein said connector has, at a first end thereof, a clevis for engaging said anchor by means of said pin, and is secured to said ratchet at a second end thereof.

19. A system according to claim 16 wherein said tensioning devices each include a ratchet winch connected to said anchor by means of said pin and operable to draw said tie-down straps toward said ratchet winch.

20. A system according to claim 10 wherein said roof structure has a drip edge; and further comprising:

a plurality of blocks mounted adjacent to and beneath said drip edge to prevent said tie-down straps from crushing said drip edge when said tie-down straps are tensioned over said roof structure between said anchors.

21. A system according to claim 20 wherein each of said blocks includes ears to retain the related tie-down strap over said blocks.

22. A system according to claim 10 wherein said building has rain gutters and further comprising:

a pass-through hole in each rain gutter at a point thereof above each of said anchors.

23. A system according to claim 22 including a well extending upwardly from the entire edge of each of said pass-through holes to retain rain water in said gutters.

24. A method of trying the roof structure of a building having a foundation to the vertical wall structure of said building, comprising:

securing a plurality of pairs of anchors to the foundation of the building, each pair in a transverse plane of the building which includes rafters, each anchor of a pair being on the opposite side of the building from the other anchor of the pair each of said anchors having one end extending outside of said foundation;

positioning a plurality of tie-down straps over the roof of the building, each in the same transverse plane as said anchors and extending downwardly from the roof to the vicinity of said anchors; and connecting each end of each of said tie-down straps to said end of a related one of said anchors under tension.

25. A method according to claim 24 wherein at least a pair of said anchors are secured in the same transverse plane of the building as a truss in the roof structure.

26. A method according to claim 24 wherein at least a pair of said anchors are secured in the same transverse plane of the building as a gable end of the roof structure.

27. A method according to claim 24 wherein said connecting step comprises connecting said straps under on the order of several hundred pounds of tension.

28. A method of preparing a building to have its roof structure secured to its vertical wall structure by tie-down straps, comprising:

providing a plurality of holes in the foundation of the building through the vertical exterior surfaces thereof, said holes arranged in pairs on opposite sides of the building in the same transverse plane of the building as a pair of rafters in the roof structure thereof;

securing an anchor for one of each tie-down strap in one of said holes; and securing a tie-down strap between each of said pairs of anchors over said roof structure.

29. A method according to claim 28 including securing a tie-down strap guide, for each tie-down strap to be used, at a point on said roof structure between the anchors related to such tie-down strap.

30. A method according to claim 28 wherein said anchors are secured in the same transverse plane as rafters in the roof structure.

31. A method according to claim 28 wherein said anchors are secured in the same transverse plane as a gable end of the roof structure.

32. A method according to claim 28 the last step including: fastening a tensioning device to each end of a plurality of tie-down straps;

securing each of said tensioning device to one of said anchors;

operating said tensioning devices so as to apply on the order of several hundred pounds of tension to each end of each said tie-down straps and allowing said tension to remain applied for on the order of one-half hour or more to stretch said tie-down straps; and removing said tie-down straps and said tensioning devices from said building and storing them for future use.

33. A method of tying the roof structure of a building having a foundation to the vertical wall structure of said building, comprising:

positioning a plurality of tie-down straps over the roof of the building, each in a transverse plane of the building which includes rafters and extending downwardly from the roof to the vicinity of said foundation;

securing a plurality of anchors to the foundation of the building in the same transverse planes as said straps, each of said anchors having one extending outside of said foundation one anchor of each pair near a corresponding and of a related strap; and connecting each end of each of said tie-down straps to said end of a related one of said anchors under tension.

* * * * *